INVENTOR.
Reino A. Peterson

United States Patent Office 3,318,642
Patented May 9, 1967

3,318,642
SELF-ALIGNING BEARING
Reino A. Peterson, Southfield, Mich., assignor to The Bunting Brass and Bronze Company, Toledo, Ohio, a corporation of Ohio
Filed Oct. 17, 1963, Ser. No. 316,973
7 Claims. (Cl. 308—26)

This invention relates to an improved self-aligning bearing and more particularly to a self-aligning bearing employing a lubricated, sintered metal bearing sleeve.

Self-aligning bearings have been known heretofore in the art, but are becoming more widely used. It has been found that manufacturing costs of certain devices can be decreased substantially by the use of self-aligning bearings. For example, housings for some motors can be manufactured at substantially lower costs when self-aligning bearings are employed, because the machining operations are simplified and reduced, due to the broader tolerances made possible by the use of such bearings. Also, self-aligning bearings more effectively accommodate shafts which are eccentric or curved.

The new bearing includes a bearing sleeve of sintered metal, preferably sintered bronze, which is centered in a supporting member or shell by a resilient, convoluted annulus which enables the bearing sleeve to be deflected transversely and pivot, thereby to function properly even though the bearings are out of alignment or the shafts are curved. The new bearing also can be modified slightly to withstand high radial loads with a limited amount of displacement and also can be modified to withstand high thrust loads.

The new bearing with the resilient metal annulus operates cooler than those heretofore known because the metal annulus can conduct heat away from the sintered bearing sleeve. In addition, the spaces defined by the annulus can be packed with lubricant to provide a supply of lubricant for the sintered bearing sleeve and thereby achieve a long-lived, substantially maintenance-free bearing. For this purpose, the metal annulus is perforated so that the lubricant can pass through it. The new bearing with the metal annulus also withstands higher temperatures than those heretofore known and also effectively resists chemicals. Further, the metal annulus resists gases such as ozone which is formed by certain electrical equipment, as well as the effects of radiation. The metal annulus also will not take permanent set and can be used to conduct current between the shaft and housing.

It is, therefore, a principal object of the invention to provide an improved self-aligning bearing having the advantages outlined above.

Another object of the invention is to provide an improved self-aligning bearing which can withstand high transverse of radial loading.

Still another object of the invention is to provide an improved self-aligning bearing which can withstand high thrust loads.

Other objects and advantages of the invention will be apparent from the following detailed description of preferred embodiments thereof, reference being made to the accompanying drawing, in which.

Figure 1:
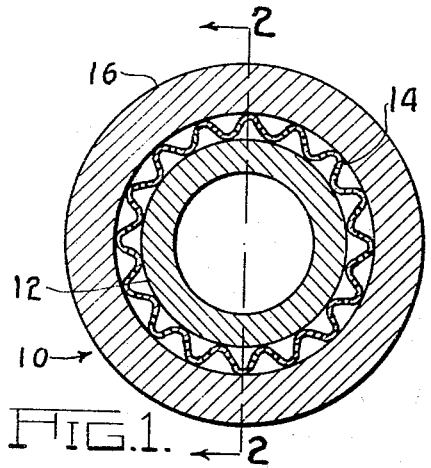
FIG. 1 is a view in vertical, transverse cross section of a self-aligning bearing embodying the invention.
Figure 2:
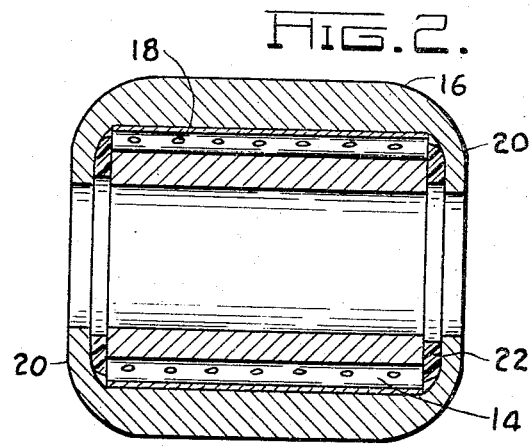
FIG. 2 is a view in vertical, longitudinal cross section taken along the line 2—2 of FIG. 1.

Referring to FIGS. 1 and 2, a bearing embodying the invention is indicated at 10 and includes a central bearing sleeve 12 of sintered metal, preferably sintered bronze, which can retain a lubricant and through which a lubricant can pass. The sleeve 12 can be made according to any of the sintering techniques known in the art. A resilient, convoluted annulus 14 preferably of spring steel, surrounds the bearing sleeve 12 with inner ends of the convolutions in contact with the sleeve. The outer ends of the convolutions contact the inner surface of a bearing shell 16 to normally retain the bearing sleeve 12 centered therein. A plurality of spaces formed between the annulus 14 and the bearing sleeve 12, as well as a plurality of spaces formed between the bearing shell 16 and the annulus 14, are packed with lubricant. The annulus 14 is perforated with holes 18 to enable the lubricant to pass through the annulus 14 from the outer spaces to the inner spaces and to the sleeve 12. When the spaces are packed, a large supply of lubricant is thereby provided for the sintered sleeve 12 so that the life of the bearing 10 is greatly extended without need for maintenance.

Retainers are provided at the ends of the bearing shell 16 by turning in the ends thereof to form inwardly-extending flanges 20. One of the ends is turned in initially and the second one is turned in after the components are assembled in the shell and the lubricant packed therein. Sealing rings 22 are interposed at the ends of the shell 18 between the flanges 20 and the sleeve 12 and annulus 14. These rings hold the lubricant in the spaces formed by the annulus 14 and also resiliently support the sleeve 12. If desired, the shell 16 can be provided with a grease fitting so that the lubricant spaces can be replenished when necessary.

Figure 3:
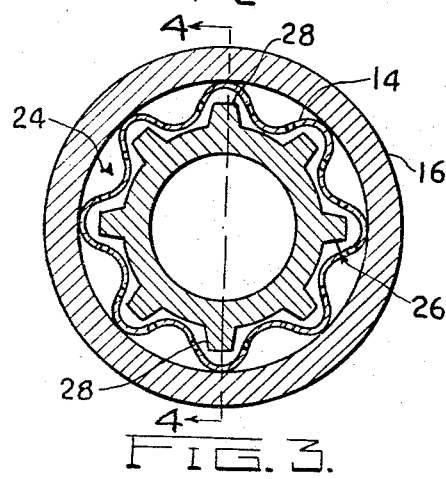
FIG. 3 is a view in vertical, transverse cross section of a slightly modified self-aligning bearing according to the invention.
Figure 4:
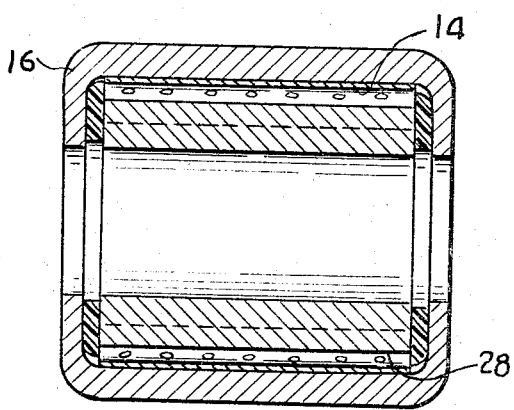
FIG. 4 is a view in vertical, longitudinal cross section taken along the line 4—4 of FIG. 3.
Figure 5:
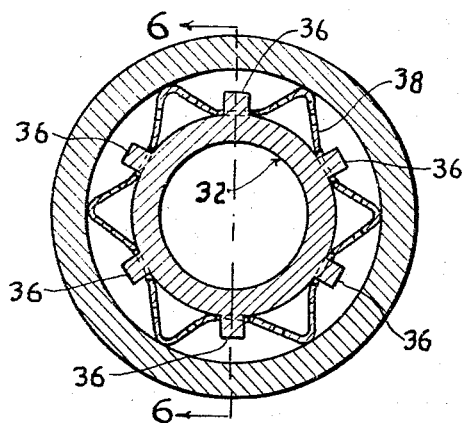
FIG. 5 is a view in vertical, transverse cross section of a further modified self-aligning bearing according to the invention.
Figure 6:
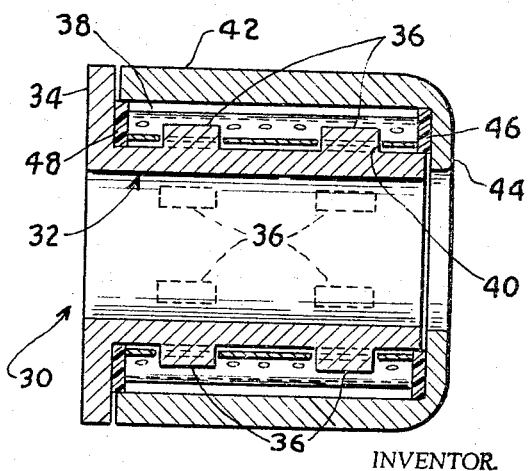
FIG. 6 is a view in vertical, longitudinal cross section taken along the line 6—6 of FIG. 5.

If the bearing 10 is subjected to excessively high transverse loading, it is possible for the resilient annulus 14 to be permanently deformed if squeezed sufficiently hard between the sleeve 12 and the shell 16 and it is also possible for the shaft to be deflected enough to break. To prevent such occurrences, a modified bearing 24 of FIGS. 3 and 4 can be employed. The bearing 24 includes a modified sintered sleeve 26 having a plurality of splines 28 extending longitudinally thereof. The bearing 24 also includes the resilient annulus 14 and the bearing shell 16 which can be the same as the corresponding parts of the bearing 10. The splines 28 are of similar configuration to the convolutions of the annulus 14 and limit the maximum distance the sleeve 26 can move toward the shell 16 regardless of the transverse forces.

Where high thrust loads are to be encountered, a modified bearing 30 of FIGS. 5 and 6 can be used. The bearing 30 includes a modified sintered bearing sleeve 32 having a wide annular flange 34 at one end and also having a plurality of radially outwardly extending projections 36 which are positioned in rows of two each longitudinally of the sleeve 32. A slightly modified resilient, convoluted annulus 38 surrounds the sleeve 32 and has a plurality of openings 40 along the inner ends of the convolutions corresponding in size and shape to the projections 36. The sleeve 32 and the annulus 38 are retained in a bushing shell 42 having an inturned retainer or flange 44 with the sleeve flange 34 adjacent the other end of the shell 42. A sealing ring 46 is located adjacent the flange 44 and a suitable sealing ring 48 can be used at the opposite end of the shell 42 to maintain lubricant in the annulus spaces. For lower thrust loads, either the flange 34 or the projections 40 can be eliminated.

The bearing 30 can be made somewhat similarly to the bearings 10 and 24 except that the sleeve 32 and the annulus 38 are assembled by inserting the projections 36 in the spaces formed by the outwardly extending convolutions of the annulus and by then twisting the sleeve 32 relative to the annulus 38 to cause the projections 36 to snap into the openings 40.

With the bearing 30, when a thrust force urges the sleeve 32 toward the right, as shown in FIG. 6, the force is resisted by the sealing ring 46 when engaged by the annulus 38 which also tends to move toward the right, due to the cooperation between the projections 36 and the openings 40. The thrust is further resisted by movement of the sleeve flange 34 against the sealing ring 48. As pointed out above, either the flange 34 or the projections 40 can be sufficient to resist lower thrust loads.

Various modifications of the above described embodiments will be apparent to those skilled in the art, and it is to be understood that such modifications can be made without departing from the scope of the invention, if they are within the spirit and tenor of the accompanying claims.

What I claim is:

1. A self-aligning bearing comprising a bearing sleeve having a continuous wall of sintered metal capable of passing lubricant from the outer surface thereof to the inner surface, a convoluted annulus of resilient metal surrounding said sleeve with the inner ends of the convolutions in contact with said sleeve, said annulus being perforated to enable lubricant to pass from one side of it to the other, a supporting shell surrounding said annulus and contacting the outer ends of the convolutions, lubricant in the space between said sleeve and said shell on both sides of said annulus, and sealing means retaining said annulus and said lubricant in said shell.

2. A self-aligning bearing comprising a bearing sleeve having a continuous wall of sintered metal, a convoluted annulus surrounding said sleeve with inner ends of the convolutions being in contact with said sleeve, said sleeve having a plurality of outwardly extending splines extending longitudinally of said sleeve and of a contour similar to the outwardly extending convolutions, a supporting shell surrounding said annulus and contacting the outer ends of said convolutions, said splines limiting the distance said sleeve can move toward said shell, said supporting shell having end flanges turned inwardly to retain said annulus, and sealing rings between said annulus and said flanges to retain lubricant within spaces formed between said annulus and said shell and between said annulus and said sleeve.

3. A self-aligning bearing comprising a bearing sleeve having a continuous wall with an inner cylindrical surface, said sleeve having a plurality of outwardly extending projections integral therewith, a convoluted, one-piece resilient annulus surrounding said sleeve, the inner ends of the convolutions of said annulus having openings therein corresponding in size and shape to said projections to receive said projections, said sleeve and said annulus being separate to facilitate assembly thereof, a supporting shell surrounding said annulus and contacting the outer ends of the convolutions, said shell having at least one end flange extending inwardly to aid in retaining said annulus therein, and a sealing ring between said end flange and said annulus.

4. A self-aligning bearing according to claim 3 characterized by said sleeve having an outwardly-extending annular flange at the end of said shell opposite said one end flange, said annular flange extending outwardly beyond the inner surface of said shell, and a sealing ring between said annular flange and said annulus.

5. A self-aligning bearing comprising a bearing sleeve having a continuous cylindrical wall adapted to rotatably receive a shaft, said sleeve being capable of transmitting lubricant from the outer surface thereof to the inner surface, a convoluted, one-piece annulus of resilient metal surrounding said sleeve and extending substantially the length thereof, the inner ends of the convolutions of said annulus being in contact with the outer surface of said sleeve, said annulus being perforated to enable lubricant to pass from the outside thereof to the inside, a supporting shell surrounding said annulus and having an inner surface contacting the outer ends of said convolutions, said supporting shell having an end flange extending inwardly beyond one end of said annulus and said sleeve to aid in retaining said annulus and said sleeve, a sealing ring located between said end flange and said annulus to prevent the escape of lubricant from the space between said sleeve and said shell, one of said sleeve or said shell forming an annular flange at the end of said shell opposite said end flange, and a second sealing ring located between said annular flange and said annulus to prevent escape of lubricant from the other end of the space between said sleeve and said shell.

6. A self-aligning bearing according to claim 5 characterized by said sleeve being of sintered metal.

7. A self-aligning bearing comprising a bearing sleeve having a continuous wall with a cylindrical inner bearing surface, said sleeve being capable of passing lubricant therethrough from the outer surface to the inner surface, a convoluted, one-piece annulus surrounding said sleeve with inner ends of the convolutions being in contact with said sleeve, said sleeve having a plurality of outwardly extending, rigid splines extending longitudinally of said sleeve substantially co-extensive with said convoluted annulus and located where the convolutions of said annulus extend outwardly, a supporting shell surrounding said annulus and contacting the outer ends of said convolutions, said splines limiting the extent to which said sleeve can move toward said shell to limit maximum compressive force on said annulus, a lubricant located between said shell and said sleeve on both sides of said annulus, and sealing means at each end of said shell to aid in retaining the lubricant between said sleeve and said shell.

References Cited by the Examiner

UNITED STATES PATENTS

| | | |
|---|---|---|
| 2,106,860 | 2/1938 | Tibbetts. |
| 2,307,874 | 1/1943 | Bilde _____ 308—72 |
| 2,851,314 | 9/1958 | Thomson _____ 308—26 |
| 3,122,399 | 2/1964 | Hunter _____ 308—8 |
| 3,232,684 | 2/1966 | Neubert _____ 308—152 |

FOREIGN PATENTS

| | | |
|---|---|---|
| 445,576 | 11/1912 | France. |
| 1,029,525 | 3/1953 | France. |

MARTIN P. SCHWADRON, Primary Examiner.

DAVID J. WILLIAMOWSKY, Examiner.

I. C. COHEN, N. ABRAMS, Assistant Examiners.